(12) United States Patent
Koechlin

(10) Patent No.: US 10,491,063 B2
(45) Date of Patent: Nov. 26, 2019

(54) ROTOR OF A ROTATING ELECTRIC MACHINE, COMPRISING A ROTOR BODY IN WHICH RECESSES ARE PROVIDED

(71) Applicant: MOTEURS LEROY-SOMER, Angouleme (FR)

(72) Inventor: Samuel Koechlin, Angouleme (FR)

(73) Assignee: MOTEURS LEROY-SOMER, Angouleme (FR)

( * ) Notice: Subject to any disclaimer, the term of this patent is extended or adjusted under 35 U.S.C. 154(b) by 64 days.

(21) Appl. No.: 14/428,134

(22) PCT Filed: Sep. 12, 2013

(86) PCT No.: PCT/IB2013/058500
§ 371 (c)(1),
(2) Date: Mar. 13, 2015

(87) PCT Pub. No.: WO2014/041507
PCT Pub. Date: Mar. 20, 2014

(65) Prior Publication Data
US 2015/0229170 A1    Aug. 13, 2015

(30) Foreign Application Priority Data
Sep. 13, 2012  (FR) ...................................... 12 58587

(51) Int. Cl.
*H02K 1/27*        (2006.01)
(52) U.S. Cl.
CPC ....... *H02K 1/2766* (2013.01); *H02K 2213/03* (2013.01)
(58) Field of Classification Search
CPC ............................ H02K 1/2766; H02K 1/276
(Continued)

(56) References Cited

U.S. PATENT DOCUMENTS 6,121,706 A   9/2000  Nashiki et al.
6,630,762 B2  10/2003 Naito et al.
(Continued)

FOREIGN PATENT DOCUMENTS

DE   10253950 A1   7/2003
EP    0746079 A2  12/1996
(Continued)

OTHER PUBLICATIONS

Sakuma (JP 2003158838 A) English Translation.*
(Continued)

*Primary Examiner* — Quyen P Leung
*Assistant Examiner* — Robert E Mates
(74) *Attorney, Agent, or Firm* — Oliff PLC

(57) ABSTRACT

The present invention concerns a rotor of a rotating electric machine, comprising a rotor body (2) in which recesses (3) are provided in such a way as to define the poles (4) of the rotor, in particular at least three recesses per pole, each pole having a radial axis of the pole, the recesses (3) having an elongated shape and each comprising two short sides, the recesses being disposed in one or a plurality of rows per pole, one row comprising at least two, or indeed at least three recesses (3) disposed consecutively, the short sides thereof defining, between two consecutive recesses of a given row, a material bridge, said material bridge generally extending along a longitudinal axis (2) of the bridge oriented closer to the radial axis of the corresponding pole of the rotor, the further one is from the rotational axis.

15 Claims, 4 Drawing Sheets

Figures 4, 5:
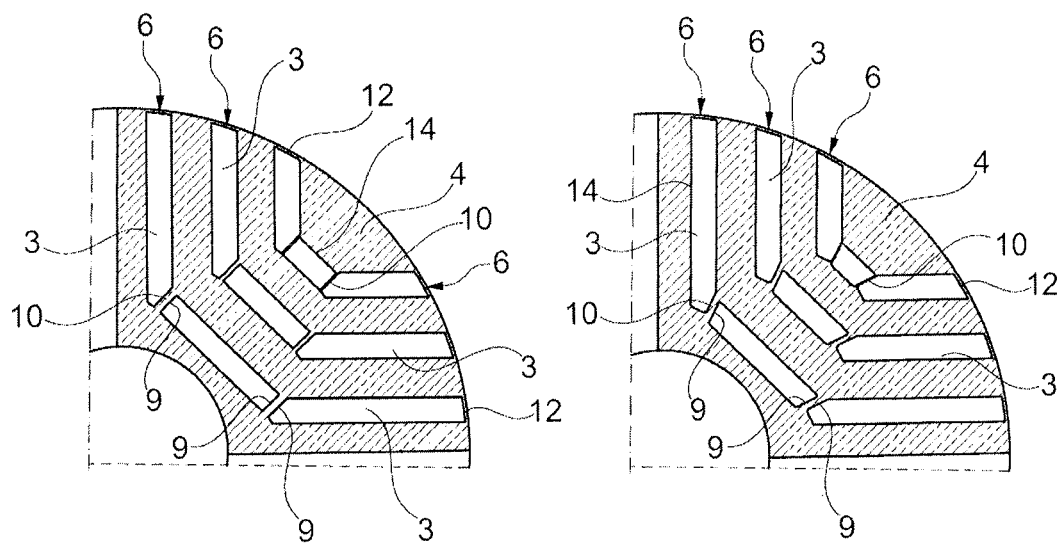

(58) Field of Classification Search
USPC .................... 310/156.53, 156.56, 156.57
See application file for complete search history.

(56) References Cited

U.S. PATENT DOCUMENTS

| | | | |
|---|---|---|---|
| 7,498,708 | B2 | 3/2009 | Brown et al. |
| 7,779,153 | B2 | 8/2010 | Van den Heuvel et al. |
| 2002/0175584 | A1 | 11/2002 | Koharagi et al. |
| 2003/0164655 | A1* | 9/2003 | Biais ............... H02K 1/2726 310/156.53 |
| 2006/0043812 | A1* | 3/2006 | Cheong ............. H01F 13/003 310/156.53 |
| 2007/0096579 | A1* | 5/2007 | Aydin ............... H02K 1/2766 310/156.56 |
| 2007/0228862 | A1 | 10/2007 | Welchko et al. |
| 2009/0224624 | A1 | 9/2009 | Kumar et al. |
| 2012/0146444 | A1 | 6/2012 | Hoduchi et al. |

FOREIGN PATENT DOCUMENTS

| | | | | |
|---|---|---|---|---|
| EP | 1276204 | A2 | | 1/2003 |
| EP | 1763121 | A2 | | 3/2007 |
| JP | 2003158838 | A | * 5/2003 | ............. H02K 1/276 |
| WO | 2007/055775 | A2 | 5/2007 | |
| WO | 2008/123086 | A1 | 10/2008 | |
| WO | 2010/039786 | A2 | 4/2010 | |
| WO | 2011/001533 | A1 | 1/2011 | |
| WO | 2011/016089 | A1 | 2/2011 | |
| WO | WO 2012004761 | A2 | * 1/2012 | ............... H02K 1/24 |

OTHER PUBLICATIONS

Definition of rectilinear Merriam-Webster Dictionary (Sep. 15, 2017).*
Jan. 2, 2014 Search Report issued in International Application No. PCT/IB2013/058500.
Jan. 2, 2014 Written Opinion issued in International Application No. PCT/IB2013/058500.
Jun. 14, 2017 Office Action issued in Chinese Patent Application No. 201380047922.1.
Apr. 11, 2018 Opposition issued in European Patent Application No. 13795859.1.
Oct. 1, 2018 Office Action issued in European Patent Application No. 17167976.4.

* cited by examiner

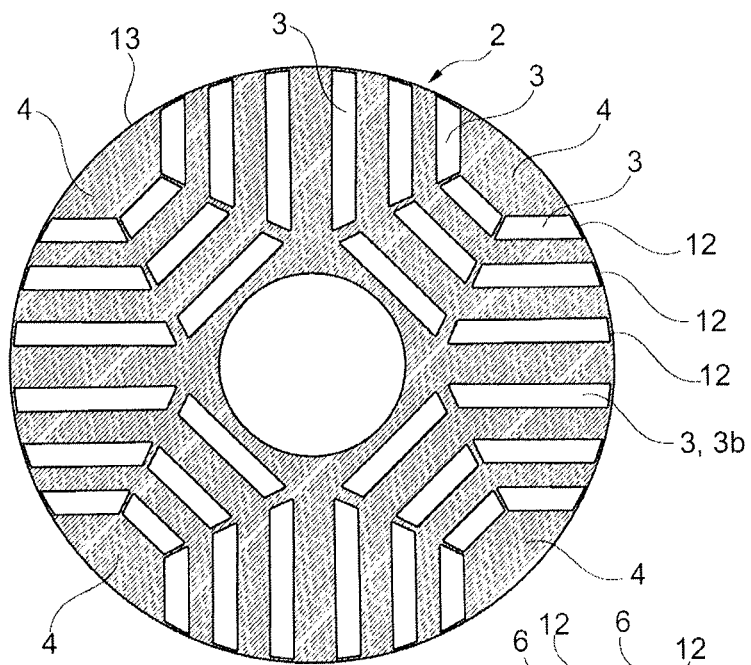
Fig. 1
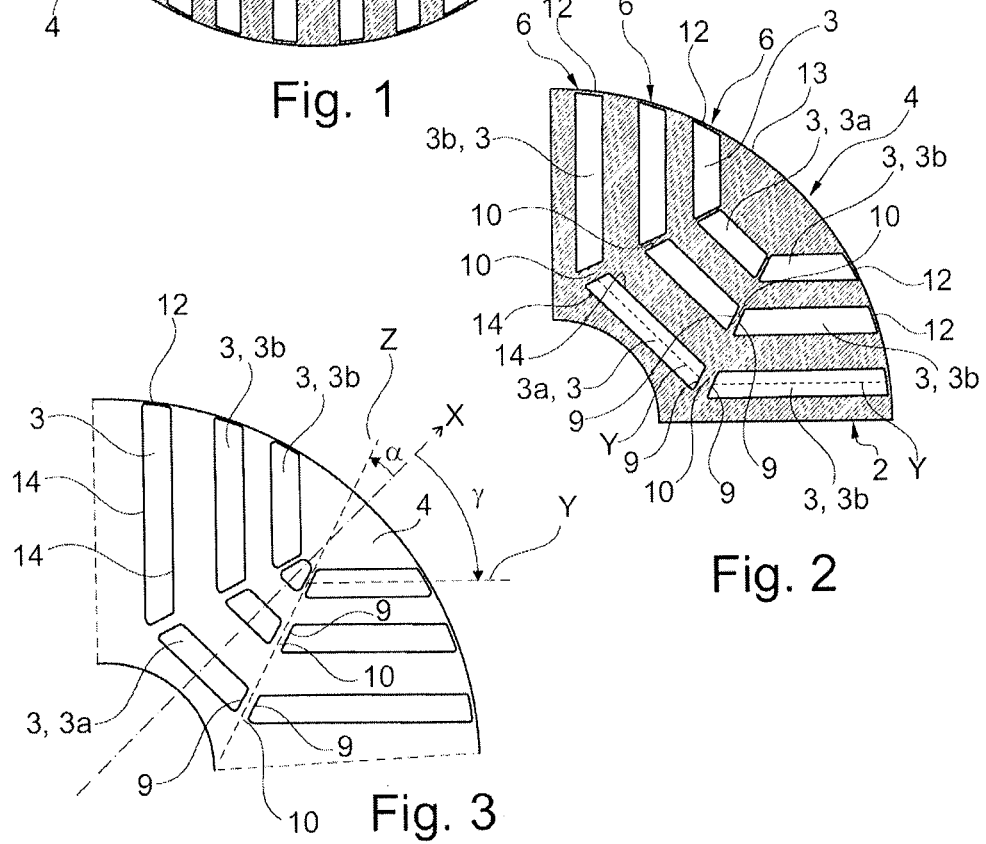
Fig. 2
Fig. 3

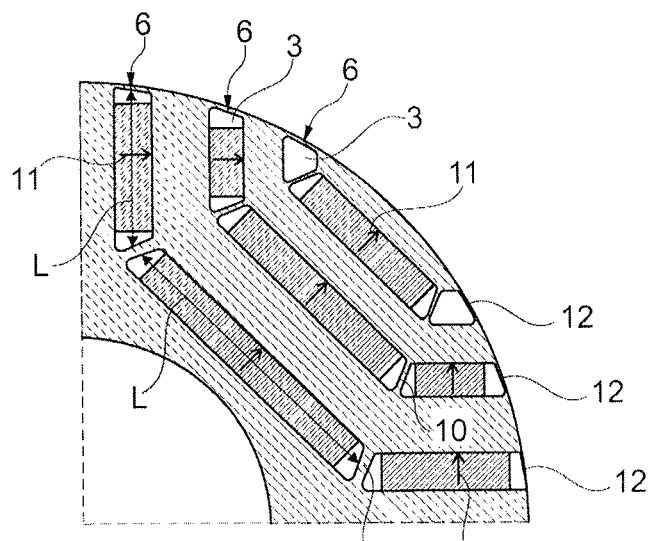
Fig. 7
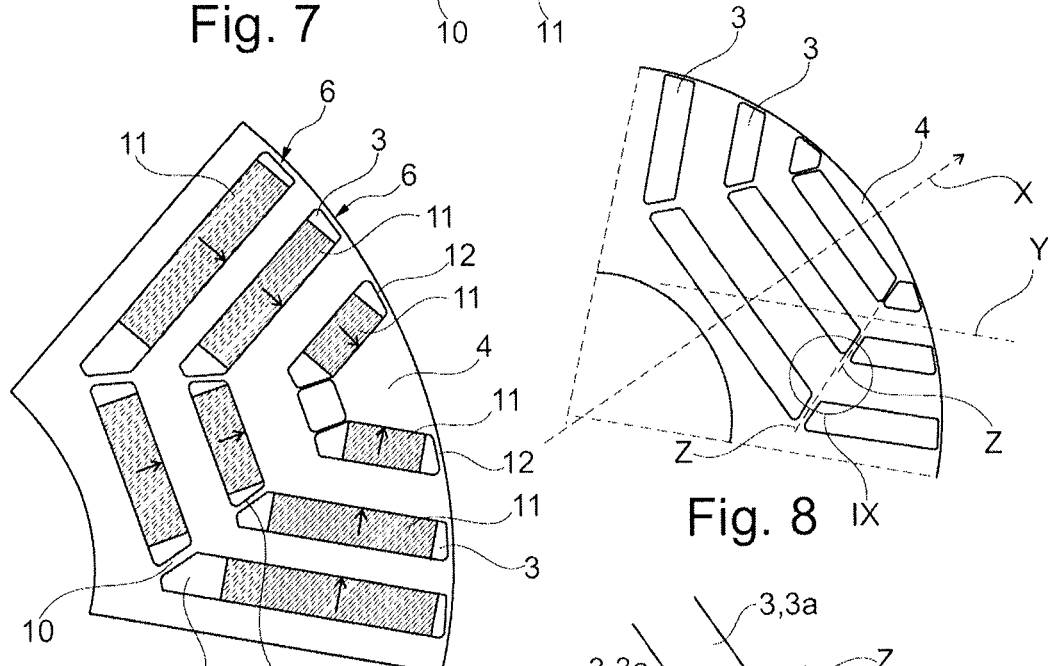
Fig. 7a
Fig. 8
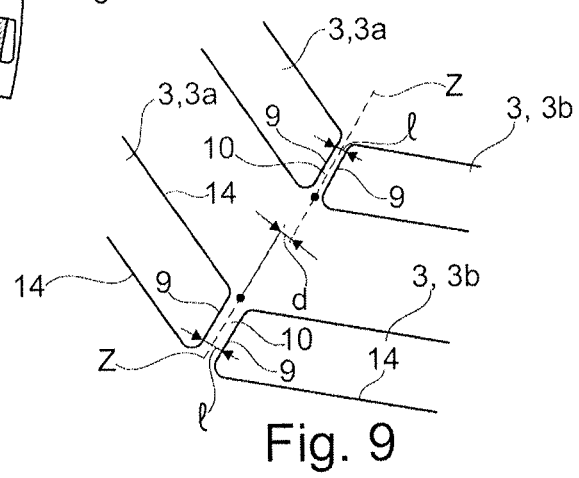
Fig. 9

ROTOR OF A ROTATING ELECTRIC MACHINE, COMPRISING A ROTOR BODY IN WHICH RECESSES ARE PROVIDED

The present invention relates to rotating electric machines, in particular those comprising a rotor of the flux concentration type, and more particularly to the rotors of such machines.

Rotating electric machines comprising a rotor which comprises magnets disposed in recesses in such a way as to define poles of the rotor are already familiar. The recesses may be in the shape of an arc of a circle or a V. They are separated from the air gap by circumferentially oriented material bridges, which make it possible to maintain the cohesion of the rotor in the face of the mechanical forces to which the machine is subjected.

Such machines are already familiar, for example, from patent documents EP 0746079, U.S. Pat. Nos. 6,121,706, 6,630,762, 7,779,153, as well as from patent applications EP 1 763 121, US 2002/0175584 and WO 2008/123086.

In order to improve the cohesion of the machine in the face of the centrifugal forces, it is also known to provide radial bridges between the recesses. These bridges are disposed, for example as in patent document U.S. Pat. No. 6,630,762, along a radial axis of the corresponding pole.

In order to optimize the distribution of the magnetic flux in the rotor, an effort is made to limit the size of the radial bridges with a view to minimizing the passage of the magnetic flux in these bridges and the losses of flux in the pole.

On the other hand, it is necessary for these radial bridges to possess a sufficient thickness to prevent their rupture, the rotor being very highly stressed by the centrifugal forces.

These contradictory demands make the design of the rotor difficult.

There is thus a need for a rotor to be available that is sufficiently strong to withstand the centrifugal forces while permitting a good circulation of the flux and a good concentration of the latter in the poles.

The invention proposes to respond to this need and accordingly has as its object, according to a first of its aspects, a rotor of a rotating electric machine comprising a rotor body in which recesses are provided in such a way as to define the poles of the rotor, there being preferably at least three recesses per pole, each pole having a radial axis of the pole,
the recesses having an elongated shape and each comprising two short sides, the recesses being disposed in one or a plurality of rows per pole, one row comprising at least two, preferably at least three, recesses disposed consecutively, the short sides thereof defining, between two consecutive recesses on a given row, a material bridge,
said material bridge generally extending along a longitudinal axis of the bridge which is oriented obliquely and which came closer to the radial axis of the corresponding pole of the rotor, when one is moving away from the rotational axis.

The rotor according to the invention makes it possible to reconcile the contradictory demands referred to above, that is to say on the one hand the circulation of the flux in the magnetic circuit, and, on the other hand, the mechanical strength of the rotor. The above-mentioned obliquely oriented material bridges make it possible to withstand the centrifugal forces to which the rotor may be subjected, without adversely affecting the machine on the magnetic plane.

Thanks to the invention, it is thus possible to reduce the width of the bridge for a given speed of rotation and to achieve a better concentration of the magnetic flux in the corresponding pole. It is possible to reduce the internal stresses in the bridges by improving the balance of the bending forces, and essentially to obtain nothing other than tensile stresses in said bridges. It is also possible, with a given width of bridge, to have the ability to cause the machine to function at a higher speed of rotation and to obtain an improved concentration of the magnetic flux in the poles.

The rotor may comprise permanent magnets inserted in all or part of the recesses, for example in at least half of the recesses, or indeed in more than two thirds of the recesses, and better still in all the recesses.

The permanent magnets may be made from ferrites or realized with rare earths or with any other type of magnetic material. The disposition of the recesses makes it possible to concentrate the flux of the magnets and to achieve appreciable performances with magnets made from ferrites. In one illustrative embodiment, the recesses on a given row are disposed on a central branch and on two lateral branches situated to either side of the central branch, for example resulting in a configuration in the shape of a U, the central branch, for example, being alone in comprising one or a plurality of permanent magnets, the lateral branches not accommodating a permanent magnet.

The rotor may be deprived of a permanent magnet. What is involved in this case is a rotor of a reluctance machine.

The expression "radial axis of the pole" is used to denote a radially oriented axis of the pole, that is to say oriented according to a radius of the rotor. This may be an axis of symmetry for the pole. Said radial axis may intersect the apex of the pole.

The material bridges formed between the recesses may extend obliquely in general along a longitudinal axis of the bridge, which, together with the radial axis of the corresponding pole of the rotor, may form an angle having a value other than zero and greater than 5°, and preferably greater than 10°, for example in the order of about 15°. The angle may be smaller than 45°, preferably smaller than 30°, or indeed smaller than 20°.

The expression "longitudinal axis of the bridge" is used to denote the axis disposed in a central manner in relation to the two short sides of the adjacent recesses defining said material bridge. This axis is preferably rectilinear.

For a given pole, the recesses of said pole may be disposed in a single row. The concavity of the row may be oriented towards the apex of the pole, that is to say towards the air gap.

For a given pole, the recesses of said pole are preferably disposed in a plurality of rows, each having a concavity which may be oriented towards the apex of the pole, in particular in substantially concentric rows. The expression "concentric" is used to denote that median axes of the recesses on the rows, when considered in a plane perpendicular to the rotational axis of the rotor, intersect one another at a given point. This disposition in a plurality of concentric rows makes it possible to improve the concentration of the flux without necessarily having to increase the size of the recesses or the quantity of permanent magnets necessary in order to obtain an equivalent flux. In particular, the number of rows per pole may be two, three or four in number.

When the rotor comprises a plurality of rows for a given pole, the latter may be of a decreasing length when one moves in the direction of the air gap, the longest being closer to the rotational axis and the shortest being closer to the air gap side. The length of one row corresponds to the cumulative length of the recesses on this row.

At least two recesses on two rows of a given pole may extend in parallel one to the other. All the recesses on one row may extend parallel to the corresponding recesses on another row.

The rotor may comprise as many obliquely oriented material bridges as there are rows of recesses, or indeed up to two times more, or even three times more. The number of obliquely oriented material bridges in a pole may be equal to the number of recesses in the pole, from which the number of rows in said pole is subtracted.

One row may comprise a number of recesses strictly greater than one, for example at least two recesses, and preferably three recesses. One row may comprise, for example, one central recess and two lateral recesses. At least one row may comprise an odd number of recesses, for example at least three recesses.

Two rows of a given pole may have a different number of recesses. In an illustrative embodiment of the invention, at least one pole comprises one row of recesses comprising a lower number of recesses than those on another row of this pole, for example two compared to three for the other row. The row having the smallest number of recesses is preferably closest to the air gap and furthest from the rotational axis.

The disposition of the recesses and/or of the material bridges on a single row is preferably symmetrical in relation to the radial axis of the pole.

In one row, the recesses may be disposed in the shape of a V or in the shape of a U, the U possibly having a shape that is flared towards the air gap. In other words, the recesses constituting the lateral branches of the U may be non parallel to each other. The inclination of the radial bridges may thus be opposite that of the lateral recesses, in relation to the radial axis of the pole.

When the recesses on a given row are disposed according to an arrangement in the shape of a U, the central recess may be of a length greater than or less than that of a branch of the U. In one illustrative embodiment, the branches of the U are shorter than the central branch constituting the base of the U.

The recesses may each extend, when observed in cross section in a plane perpendicular to the rotational axis of the rotor, along a longitudinal axis which may be rectilinear or curved.

The recesses may have a width that is constant or variable as one moves along their longitudinal axis, in a plane that is perpendicular to the rotational axis of the rotor.

The short sides of a recess are oriented in the direction of the radial axis of the pole when one moves away from the rotational axis and are convergent, for example, substantially towards the apex of the pole.

The recesses may have, in cross section, that is to say perpendicularly to the rotational axis, a generally rectangular or trapezoidal shape, although this is not an exhaustive list.

The short sides of a recess may be perpendicular to the long sides of the recess. The short sides of a recess may be inclined in relation to the long sides of the recess.

At least one recess may have two long sides, one of the long sides being smaller than the other. In this case, for example when the recess is of generally trapezoidal shape, the shorter of the long sides may be situated closer to the air gap than the longer of the long sides.

The short sides of a recess may be rectilinear or curved.

The material bridges between two consecutive recesses on one row may have a width, measured perpendicularly to their longitudinal axis, of less than 8 mm, and the material bridges may have a width greater than 0.5 mm.

The permanent magnets may be of a generally rectangular shape. In view of the shape of the recesses, the installation of the magnets in the recesses may leave a free space in the recess between the magnets and the short sides of the corresponding recess. The free space is of a generally triangular shape, for example.

According to a variant embodiment of the invention, the longitudinal axes of two material bridges on two different rows of a given pole are parallel to each other.

They may be combined or, as a variant, offset by a distance d in the range between 0 (excluded value) and 10 mm. The distance d is measured perpendicularly to said longitudinal axes. Said distance d may be smaller than a multiple of the greatest width of the corresponding material bridges, for example being less than three times, or indeed less than two times said greatest width, or indeed even smaller than said greatest width. Such an offset makes it possible to compensate for any deflections that are introduced by the centrifugal forces.

The invention also has as its object according to another of its aspects, independently of or in combination with the foregoing, a rotor of a rotating electric machine comprising a rotor body in which recesses are provided in such a way as to define the poles of the rotor, there being preferably at least three recesses per pole, each pole having a radial axis of the pole, the recesses having an elongated shape and each comprising two short sides, the recesses being disposed for each pole on a plurality of rows per pole, of which the concavity may be oriented towards the air gap, one row comprising at least two, preferably at least three recesses disposed consecutively, the short sides thereof defining, between two consecutive recesses on a given row, a material bridge, said material bridge generally extending along a longitudinal axis of the bridge, the longitudinal axes of two material bridges belonging to two different rows possibly being parallel to each other, being combined or, preferably, being offset by a distance d in the range between 0 (excluded value) and 10 mm. As a variant, the longitudinal axes of these two material bridges are not parallel to each other. Together with the radial axis of the pole, they may form an angle which varies, for example increases, as one moves closer to the rotational axis.

It is particularly advantageous to provide an offset of the longitudinal axes of the material bridges, in particular when the recesses on one row are disposed in the shape of a U and when the lateral branches of each U are shorter than the central branch, or, as a variant, when the central branch is alone in comprising a permanent magnet and when the recesses corresponding to the lateral branches do not comprise a permanent magnet.

The offset of the longitudinal axes of the bridges may be produced in this case towards the radial axis of the pole as one moves closer to the rotational axis, in other words the offset is provided from the opposite side of the radial axis of the pole, as one moves closer to the apex of the pole.

The offset of the longitudinal axes of the bridges may be provided, as a variant, towards the radial axis of the pole the further one is from the rotational axis, in other words the offset is provided in the direction of the radial axis of the pole as one moves closer to the apex of the pole.

It is particularly advantageous to provide such an offset of the longitudinal axes of the material bridges, in particular when the recesses on one row are disposed in the shape of a U and when the lateral branches of each U are longer than the central branch, or, as a variant, when the lateral branches are alone in comprising a permanent magnet and when the recesses corresponding to the central branch do not comprise a permanent magnet.

The offset may be smaller than the greatest width of the bridges.

The rotor body may consist of a stack of metal sheets or of one or a plurality of individual metal sheet(s) rolled onto itself (themselves) about the rotational axis. Each sheet metal layer of the rotor body may be in a single piece. The rotor may lack individual pole parts.

The rotor may comprise a number of poles between 2 and 12, and preferably between 4 and 8.

The invention also has as its object, according to another of its aspects, a rotating electric machine comprising a rotor of the kind described above. The machine may be a reluctance machine. It may constitute a synchronous motor.

The machine may function at a nominal peripheral speed (tangential speed measured at the external diameter of the rotor) which may be greater than or equal to 100 meters per second, the machine according to the invention permitting operation at high speeds if this is desired.

The machine may have a relatively large size. The diameter of the rotor may be greater than 50 mm, preferably greater than 80 mm, being for example in the range between 80 and 300 mm.

Figure 6:
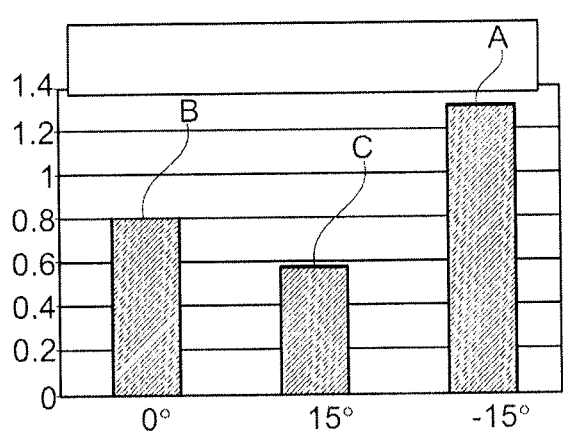

The invention may be better understood from a perusal of the following detailed description of non-restrictive illustrative embodiments thereof, and from an examination of the accompanying drawing, in which:

FIG. 1 is a schematic and partial view of a rotor in accordance with the invention, FIG. 2 represents a detail of the realization thereof, FIG. 3 is a schematic and partial view showing the longitudinal axis of a material bridge, FIGS. 4 and 5 are views similar to FIG. 2 of variant embodiments, FIG. 6 illustrates the coefficient of safety in fatigue for the configurations in FIGS. 2, 4 and 5, FIGS. 7 and 7a are views similar to FIG. 2 of variant embodiments, the direction of magnetization of the magnets being indicated by an arrow, FIG. 8 is a schematic and partial view illustrating the offset between the longitudinal axes of the material bridges, FIG. 9 is a detailed view thereof according to IX, and FIGS. 10-13 are schematic and partial views, similar to FIG. 2, of variant embodiments.

Illustrated in FIGS. 1 to 3 is a rotor 1 of a rotating electric machine, comprising a rotor body 2 in which recesses 3 are provided in such a way as to define the poles 4 of the rotor, each pole having a radial axis X.

In this example, the rotor comprises nine recesses per pole, which are disposed in three concentric rows 6 around each of the poles, the concavity of the rows being oriented towards the air gap. One row 6 comprises three recesses 3 disposed consecutively in the row. The three rows 6 of a given pole are of a decreasing length as one moves in the direction of the air gap, the longest being situated on the side of the rotational axis and the shortest on the side of the air gap.

The recesses 3 are of elongated shape, each extending along a longitudinal axis Y which forms an angle γ with the radial axis X of the pole. They each comprise two short sides 9, the respective short sides 9 of two consecutive recesses 3 on a given row 6 defining between them a material bridge 10.

The material bridge 10 extends generally along a longitudinal axis Z of the bridge that is oriented closer to the radial axis X of the corresponding pole of the rotor 1 the further one is from the rotational axis. The longitudinal axis Z of the material bridge 10 is rectilinear and forms, together with the radial axis X of the corresponding pole of the rotor, an angle α having a value other than zero and greater than 5°, which in this example is in the order of about 15°.

The short sides 9 of a recess are oriented in the direction of the radial axis X of the pole when one moves in the direction of the air gap. The recesses 3 are of generally trapezoidal shape and have two long sides 14, one of the long sides being smaller than the other, the shorter of the long sides being closer to the air gap than the longer of the long sides.

The rotor 1 comprises two times more material bridges than rows of recesses, each row 6 comprising three recesses 3 and two material bridges 10. The number of material bridges 10 in a pole 4 is equal to the number of recesses in the pole, from which the number of rows 6 in said pole is subtracted. Each row 6 comprises a central recess 3a and two lateral recesses 3b. The disposition of the recesses and of the material bridges in one row is symmetrical in relation to the radial axis X of the pole.

The lateral recesses are separated from the air gap by tangential bridges 12.

Said tangential bridges take up only a quite small part of the centrifugal forces, whereas the bridges 10 which separate two recesses must withstand the main part of the load of the centrifugal forces.

In order to make clear the advantages of the invention in terms of safety in fatigue, FIG. 6 illustrates the coefficient of safety in fatigue which reflects the centrifugal force which the rotor is able to withstand, when it is endlessly repeated, depending on the angle α. It evolves in inverse proportion to the stress at the most highly stressed point in the structure. The coefficient A corresponding to the configuration in FIG. 2 is compared to the coefficients B and C of the configurations in FIGS. 4 and 5, for which the angle α is respectively zero, the axes of the material bridges 10 being parallel to the radial axis X of the pole, and 15° in the opposite direction, the axes of the material bridges 10 being oriented away from the radial axis X of the corresponding pole of the rotor 1 as one moves in the direction of the air gap 11. It will be appreciated that the coefficient of safety in fatigue is at its maximum for the configuration according to the invention, where the axis Z is oriented closer to the axis X of the corresponding pole as one moves closer to the air gap.

The rotor 1 may comprise permanent magnets 11 inserted into each of the recesses, the magnets not being depicted in FIG. 1 but being visible in FIG. 7, their direction of magnetization being illustrated by arrows. The permanent magnets in this example have a generally rectangular shape in cross section. The installation of the magnets in the recesses may leave a free space 15 in each recess between the magnet and the short sides of the corresponding recess. The free space may be of generally triangular shape, as illustrated.

As a variant, certain of the recesses may lack a magnet. In the illustrative embodiment illustrated in FIG. 7, the recesses on one of the rows are disposed in one central branch and two lateral branches, the central branch being alone in comprising a permanent magnet, the lateral recesses not comprising a permanent magnet. The opposite is the case in the example in FIG. 7a.

Furthermore, it can be appreciated in FIG. 7 that the central recesses on one row may have a length L greater than that of the lateral recesses on said row, and the lateral branches of the U are thus shorter than the central branch. The opposite is likewise the case in the example in FIG. 7a.

FIGS. 7 and 7a likewise differ from FIG. 1 in the fact that the material bridges 10 on the different rows at that point have a variable width 1, which diminishes as one moves closer to the air gap 13.

Furthermore, in FIG. 7, the longitudinal axes of two material bridges on two different rows are parallel to each other and are offset by a distance d other than zero, for example by about 1.5 mm, said offset being situated further away from the radial axis the further one is from the rotational axis. The distance d is measured perpendicularly to said longitudinal axes Z. The axes Z of the bridges are illustrated in FIG. 8, and the offset d between them is illustrated in FIG. 9.

In the embodiment in FIG. 7a, the offset of the longitudinal axes of the bridges may, as a variant, take place towards the radial axis of the pole the further one is from the rotational axis, in other words the offset takes place in the direction of the radial axis of the pole as one moves closer to the apex of the pole.

On the other hand, in the embodiment in FIG. 1, the longitudinal axes of two material bridges on two different rows are parallel to each other and are combined, when one is on a given side of the axis X.

Figure 10:
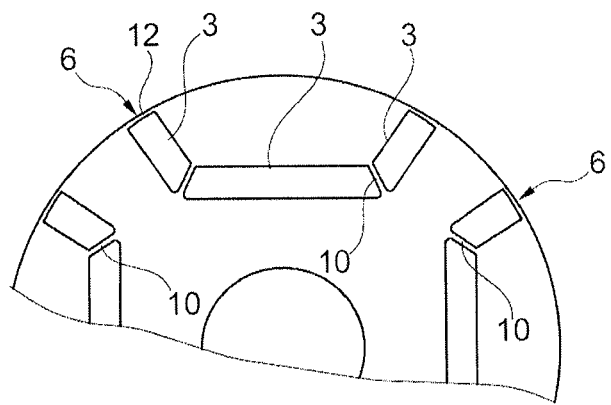
Figure 11:
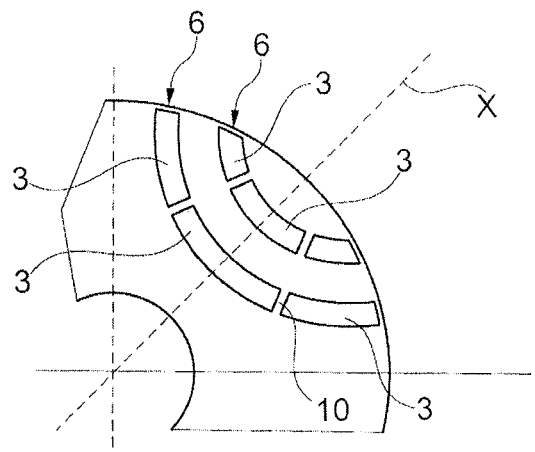
Figure 12:
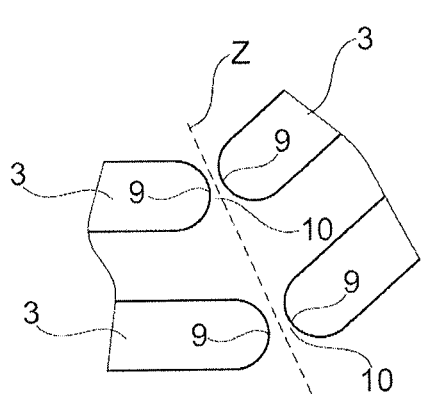

The rotor may comprise a single row of recesses per pole, as illustrated by way of example in FIG. 10.

The recesses may each extend along a longitudinal axis which may be rectilinear, as illustrated previously, or curved, as illustrated in FIG. 11.

The short sides of a recess may be rectilinear, as illustrated previously, or curved, as illustrated in FIG. 12.

Figure 13:
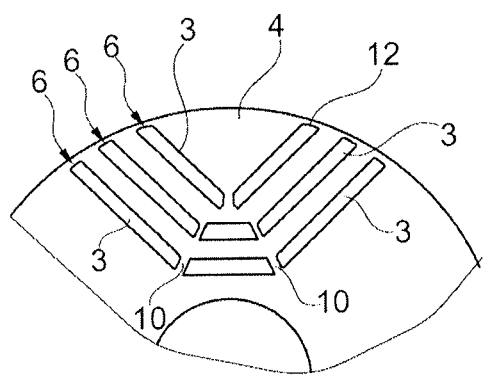

All the rows may comprise a given number of recesses, as described previously. It does not go beyond the scope of the present invention if the situation is different. Illustrated by way of example in FIG. 13 is an illustrative embodiment in which two rows of a given pole have a different number of recesses. As illustrated, one row of recesses, being the row closest to the air gap, for example, comprises two recesses, and the other rows comprise three recesses.

Furthermore, in this embodiment, the row closest to the air gap comprises two recesses disposed in the shape of a V. The bridge 10 is thus central on this row. The two other rows each comprise three recesses disposed in the shape of a flared U, each having two material bridges 10 that are symmetrical in relation to the radial axis X of the pole.

The invention is not restricted to the illustrated examples. In particular, the polarity of the rotor may be modified without going beyond the scope of the present invention.

The rotor may interact with any type of stator, having distributed or concentrated winding.

The expression "comprising a" should be understood as being synonymous with "comprising at least one".

The invention claimed is:

1. A rotor of a rotating electric machine, comprising a rotor body in which recesses are provided in such a way as to define poles of the rotor, each pole having a radial axis,
    the recesses having an elongated shape and each comprising two short sides, the recesses being disposed in a plurality of rows per pole, the recesses in one row being disposed in a shape of a U, one row comprising at least three recesses disposed consecutively, the short sides thereof defining, between two consecutive recesses on a given row, a material bridge,
    said material bridge generally extending along a longitudinal axis of the bridge which is oriented and a distance between the material bridge and the radial axis of the corresponding pole of the rotor decreases when moving away from a rotational axis of the rotor, the distance being measured perpendicular to the radial axis,
    the short sides of a recess being rectilinear, the longitudinal axes of two material bridges on two different rows of a given pole being parallel to each other, and offset by a distance strictly greater than 0 and less than or equal to 10 mm,
    the recesses corresponding to lateral branches of each U comprising at least one permanent magnet, and
    the material bridge extends generally along a longitudinal axis of the bridge, which together with a radial axis of the corresponding pole of the rotor, forms an angle having a value smaller than 45 degrees.

2. The rotor as claimed in claim 1, comprising permanent magnets inserted into at least certain of said recesses.

3. The rotor as claimed in claim 1, wherein the material bridge extends generally along the longitudinal axis of the bridge, which, together with the radial axis of the corresponding pole of the rotor, forms the angle having a value other than zero and greater than 5°.

4. The rotor as claimed in claim 1, at least one of the rows comprising an odd number of recesses.

5. The rotor as claimed in claim 1, wherein, when the rotor comprises a plurality of rows for a given pole, the rows have a decreasing length when moving in the direction of an air gap.

6. The rotor as claimed in claim 1, the disposition of the recesses and/or of the material bridges on one row being symmetrical in relation to the radial axis of the pole.

7. The rotor as claimed in claim 1, the material bridge having a width, measured perpendicularly to its longitudinal axis, of less than 8 mm.

8. The rotor as claimed in claim 1, the material bridge having a width, measured perpendicularly to its longitudinal axis, greater than 0.5 mm.

9. The rotor as claimed in claim 1, wherein the recesses are of a generally trapezoidal shape, a shorter of the long sides of the recess being closer to an air gap than a longer of the long sides.

10. The rotor as claimed in claim 1, the number of material bridges oriented obliquely in a pole being equal to the number of recesses in the pole, from which the number of rows in said pole is subtracted.

11. The rotor as claimed in claim 1, the rotor body consisting of a stack of sheet metal layers, each sheet metal layer of the rotor body being in a single piece.

12. A rotating electric machine comprising a rotor as claimed in claim 1.

13. The rotor as claimed in claim 1, wherein
    lateral branches of each U are shorter than a central branch, and
    the offset of the longitudinal axes of the material bridges is situated closer to the radial axis of the pole at a position closer to the rotational axis.

14. The rotor as claimed in claim 1, wherein
    lateral branches of each U are longer than a central branch, or the lateral branches are alone in comprising a permanent magnet and the recesses corresponding to the central branch do not comprise a permanent magnet, and
    the offset of the longitudinal axes of the material bridges is situated closer to the radial axis of the pole at a position further from the rotational axis.

15. The rotor as claimed in claim 1, wherein the short sides of a recess are rectilinear, in which the material bridge extends generally along the longitudinal axis of the bridge, which, together with the radial axis of the corresponding pole of the rotor, forms the angle having a value smaller than 30 degrees.

\* \* \* \* \*